United States Patent
Cabral et al.

(10) Patent No.: US 10,244,437 B2
(45) Date of Patent: *Mar. 26, 2019

(54) SYSTEMS AND METHODS FOR PROVIDING HOTSPOT CONNECTIVITY TO A MOBILE COMMUNICATION NETWORK ACCESS POINT IN A NETWORK OF MOVING THINGS, FOR EXAMPLE INCLUDING AUTONOMOUS VEHICLES

(71) Applicant: Veniam, Inc., Mountain View, CA (US)

(72) Inventors: Henrique Cabral, Senhora da Hora (PT); Carlos Ameixieira, Oporto (PT); Filipe Neves, Aguada de Baixo (PT); Nuno Coutinho, Oporto (PT)

(73) Assignee: Veniam, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,338

(22) Filed: Feb. 26, 2018

(65) Prior Publication Data
US 2018/0184338 A1 Jun. 28, 2018

Related U.S. Application Data

(63) Continuation of application No. 15/615,545, filed on Jun. 6, 2017, now Pat. No. 9,913,175, which is a continuation of application No. 15/203,294, filed on Jul. 6, 2016, now Pat. No. 9,674,735.

(60) Provisional application No. 62/222,121, filed on Sep. 22, 2015.

(51) Int. Cl.
*H04L 12/28* (2006.01)
*H04W 36/00* (2009.01)
*H04L 12/26* (2006.01)
*H04W 4/04* (2009.01)
*H04W 48/20* (2009.01)
*H04W 4/44* (2018.01)
(Continued)

(52) U.S. Cl.
CPC ..... *H04W 36/0022* (2013.01); *H04L 43/0811* (2013.01); *H04W 4/046* (2013.01); *H04W 4/44* (2018.02); *H04W 48/20* (2013.01); *H04W 36/03* (2018.08); *H04W 84/18* (2013.01)

(58) Field of Classification Search
USPC .............................. 370/252, 238, 329, 389
See application file for complete search history.

(56) References Cited

U.S. PATENT DOCUMENTS

| | | |
|---|---|---|
| 8,571,578 B1 | 10/2013 | Chen et al. |
| 9,674,735 B2 | 6/2017 | Cabral et al. |
| 2003/0060222 A1 | 3/2003 | Rune |

(Continued)

OTHER PUBLICATIONS

PCT International Search Report and Written Opinion dated Dec. 9, 2016 for PCT Patent Application No. PCT/US2016/52908.

(Continued)

*Primary Examiner* — John Pezzlo
(74) *Attorney, Agent, or Firm* — McAndrews, Held & Malloy, Ltd.

(57) ABSTRACT

Systems and methods for managing connectivity in a network of moving things. As non-limiting examples, various aspects of this disclosure provide systems and methods for managing connectivity in a network in which at least a portion of the network access points are moving.

23 Claims, 12 Drawing Sheets

(51) Int. Cl.
*H04J 1/16* (2006.01)
*H04W 84/18* (2009.01)

(56) References Cited

U.S. PATENT DOCUMENTS

| | | |
|---|---|---|
| 2005/0185615 A1* | 8/2005 | Zegelin ............ H04W 48/20 370/331 |
| 2005/0273255 A1 | 12/2005 | Watkins et al. |
| 2006/0104232 A1 | 5/2006 | Gidwani |
| 2007/0010248 A1* | 1/2007 | Dravida ............ H04W 60/00 455/435.1 |
| 2007/0147255 A1 | 6/2007 | Oyman |
| 2007/0167174 A1* | 7/2007 | Halcrow ............ H04W 48/16 455/456.2 |
| 2007/0174467 A1 | 7/2007 | Ballou, Jr. |
| 2007/0263616 A1 | 11/2007 | Castro |
| 2009/0093232 A1 | 4/2009 | Gupta et al. |
| 2009/0124284 A1 | 5/2009 | Scherzer |
| 2013/0167196 A1* | 6/2013 | Spencer ............ H04W 8/22 726/3 |
| 2013/0281118 A1 | 10/2013 | Lipman et al. |
| 2014/0045536 A1* | 2/2014 | Sydir ............ H04W 4/021 455/456.5 |
| 2014/0153556 A1 | 6/2014 | Wu et al. |
| 2014/0204934 A1 | 7/2014 | Nicosia |
| 2015/0004974 A1 | 1/2015 | Karim-Cherkandi et al. |
| 2015/0072697 A1 | 3/2015 | Shen et al. |
| 2017/0082447 A1 | 3/2017 | Ricci |
| 2017/0086103 A1 | 3/2017 | Cabral et al. |
| 2017/0280361 A1 | 9/2017 | Cabral et al. |
| 2018/0041943 A1* | 2/2018 | Visuri ............ H04W 76/10 |

OTHER PUBLICATIONS

Notification Concerning Transmittal of International Preliminary Report on Patentability; International Preliminary Report on Patentability dated Apr. 5, 2018 corresponding to International Application No. PCT/2016/052908.

* cited by examiner

SYSTEMS AND METHODS FOR PROVIDING HOTSPOT CONNECTIVITY TO A MOBILE COMMUNICATION NETWORK ACCESS POINT IN A NETWORK OF MOVING THINGS, FOR EXAMPLE INCLUDING AUTONOMOUS VEHICLES

CROSS-REFERENCE TO RELATED APPLICATIONS/INCORPORATION BY REFERENCE

This patent application is a continuation of U.S. patent application Ser. No. 15/615,545, filed Jun. 6, 2017, expected to issue as U.S. Pat. No. 9,913,175 on Mar. 6, 2018, and titled "Systems and Methods for Managing Connectivity Between Access Points and Hotspots in a Network of Moving Things, for Example Including Autonomous Vehicles," which is a continuation of U.S. patent application Ser. No. 15/203,294, filed Jul. 6, 2016, now U.S. Pat. No. 9,674,735, and titled "Systems and Methods for Managing Connectivity in a Network of Moving Things," which makes reference to, claims priority to, and claims benefit from U.S. Provisional Application Ser. No. 62/222,121, titled "Systems and Methods for Managing Connectivity in a Network of Moving Things," filed on Sep. 22, 2015, each of which is hereby incorporated herein by reference in its entirety. The present application is also related to U.S. Provisional Patent Application Ser. No. 62/222,192, titled "Communication Network of Moving Things," filed on Sep. 22, 2015; U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb.

16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving moving networks. As a non-limiting example, current communication networks are unable to adequately manage connectivity in a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
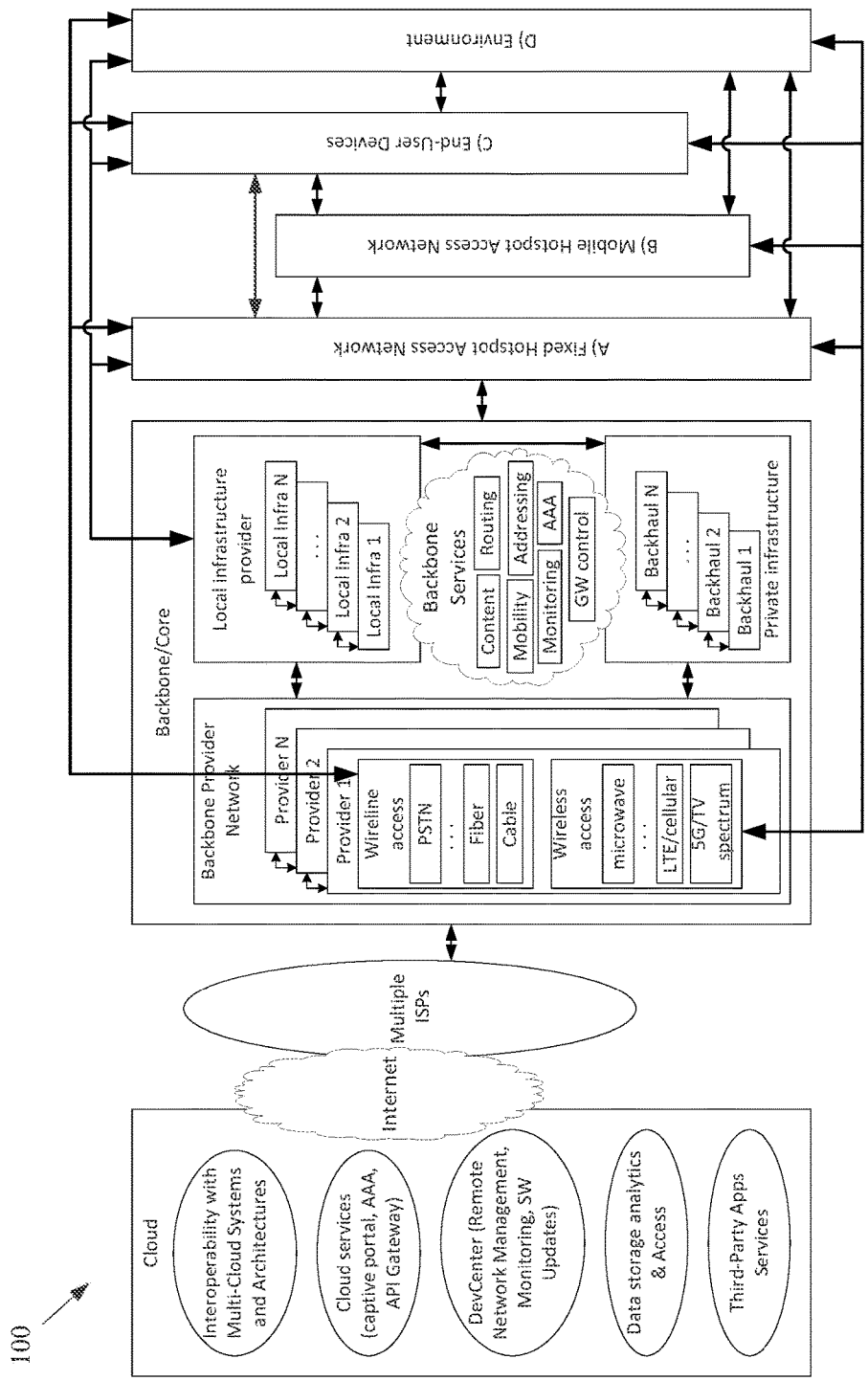
FIG. 1 shows a block diagram of a communication network, in accordance with various aspects of this disclosure.

Various aspects of this disclosure provide systems and methods for managing connectivity in a network of moving things. As non-limiting examples, various aspects of this disclosure provide systems and methods for managing connectivity in a network in which at least a portion of the network access points are moving.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the Cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller (NC), etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a Cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, 600, 700, 800, 900, and 1000 discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-Cloud systems and architectures. Another example component (e.g., a Cloud service component) may, for example, provide various Cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
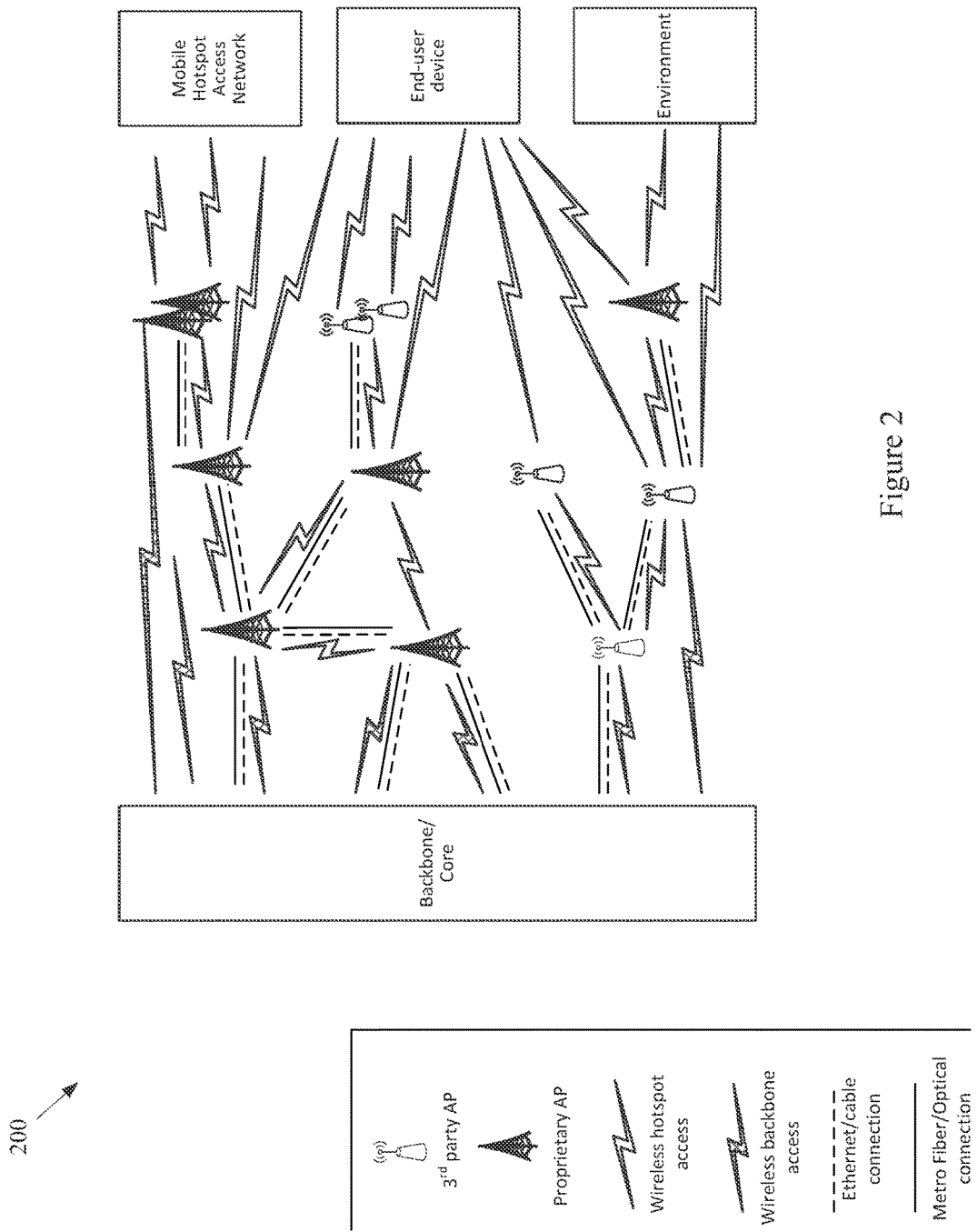
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, 600, 700, 800, 900, and 1000, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
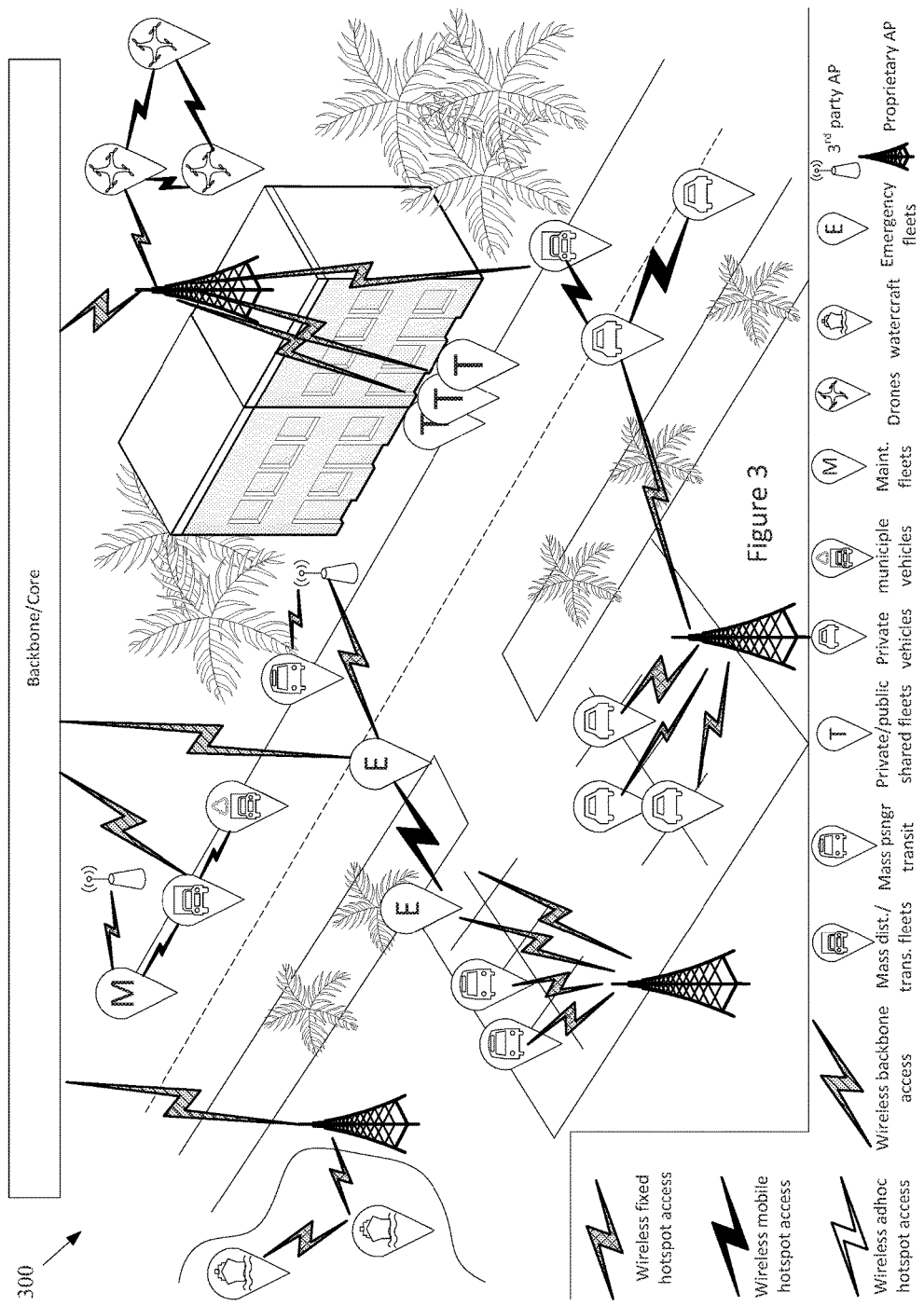
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, 600, 700, 800, 900, and 1000, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
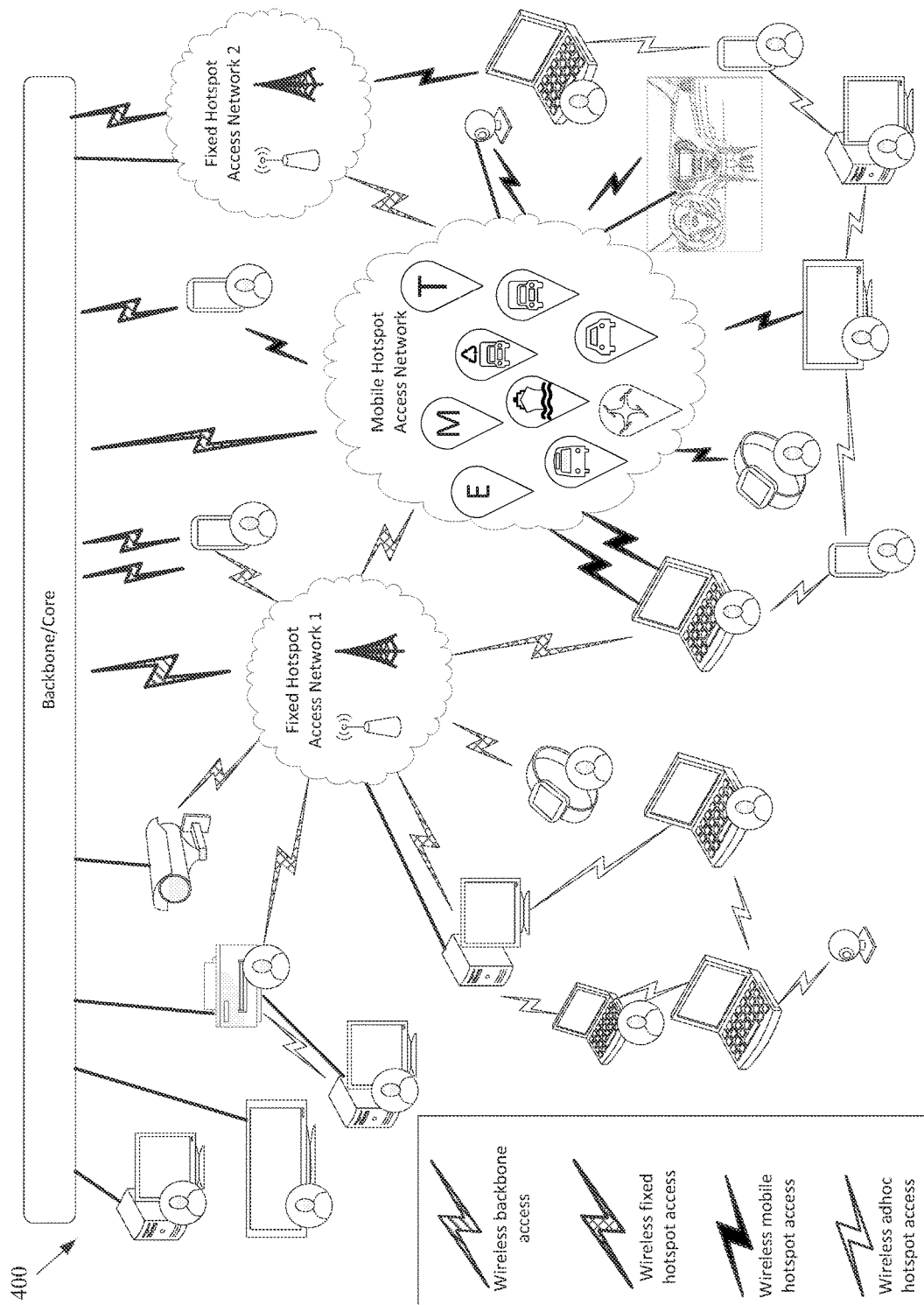
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, 600, 700, 800, 900, and 1000, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
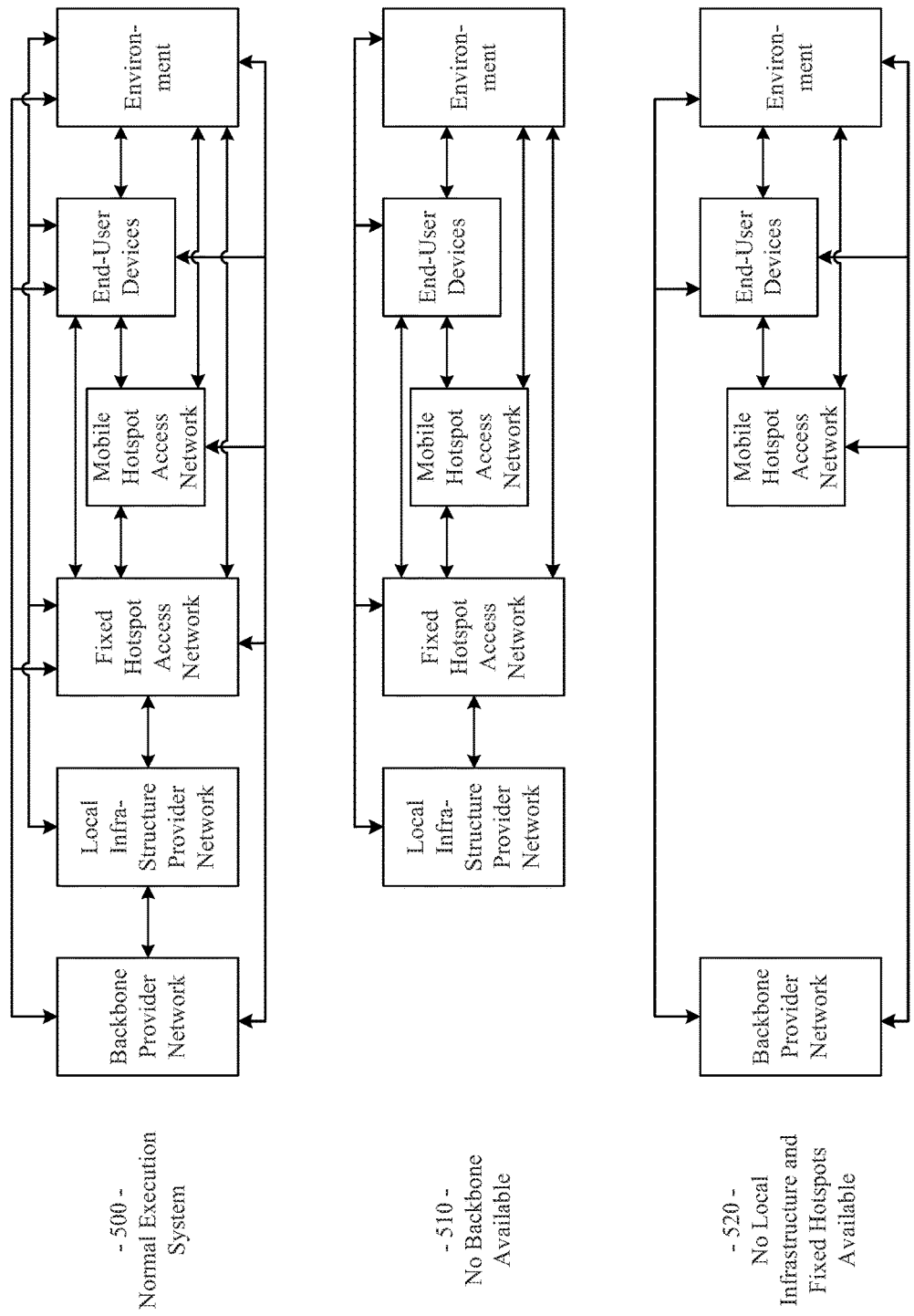
FIGS. 5A-5C show a plurality of network configurations illustrating the flexibility and/or and resiliency of a communication network, in accordance with various aspects of this disclosure.
Figure 5B:
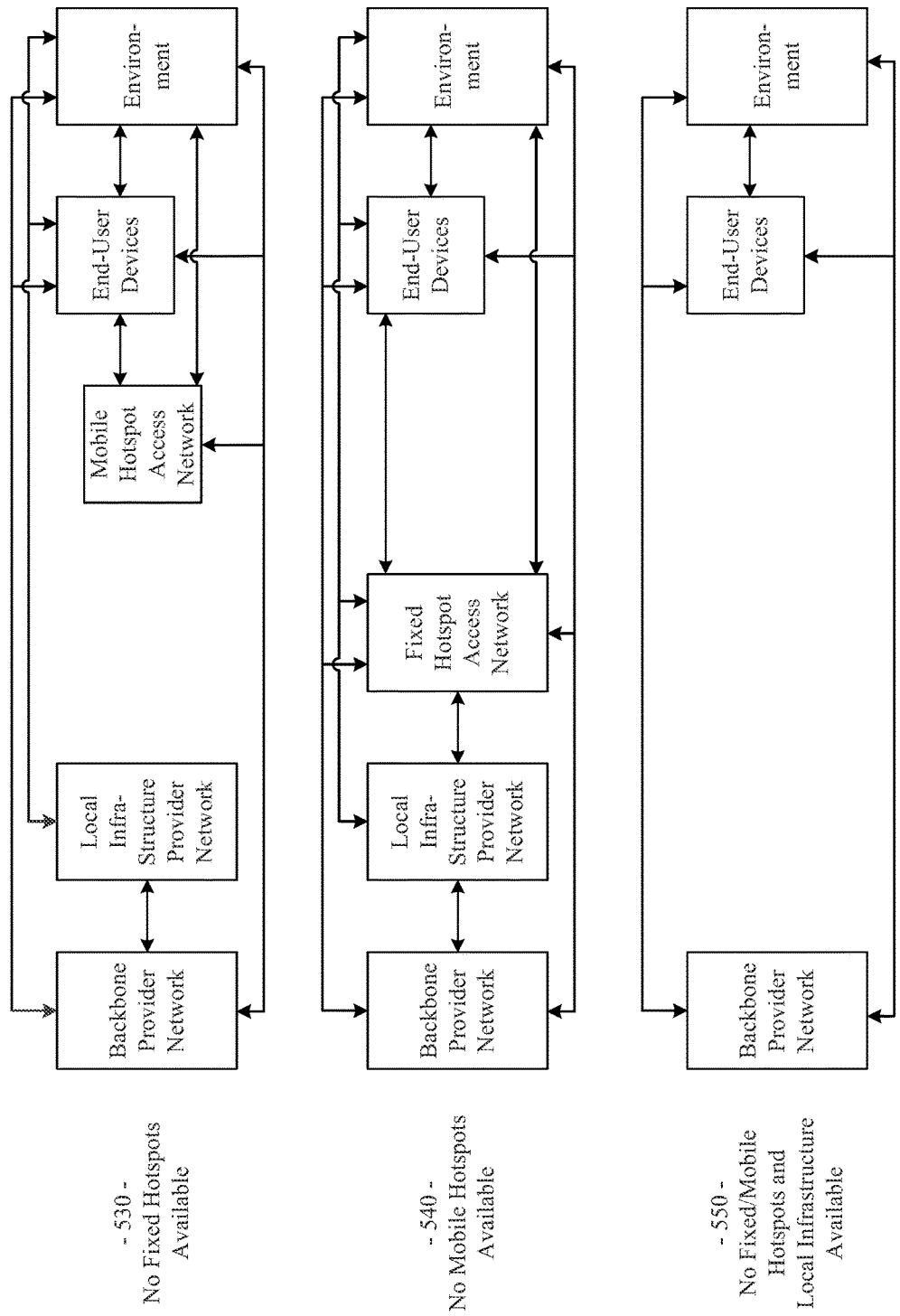
Figure 5C:
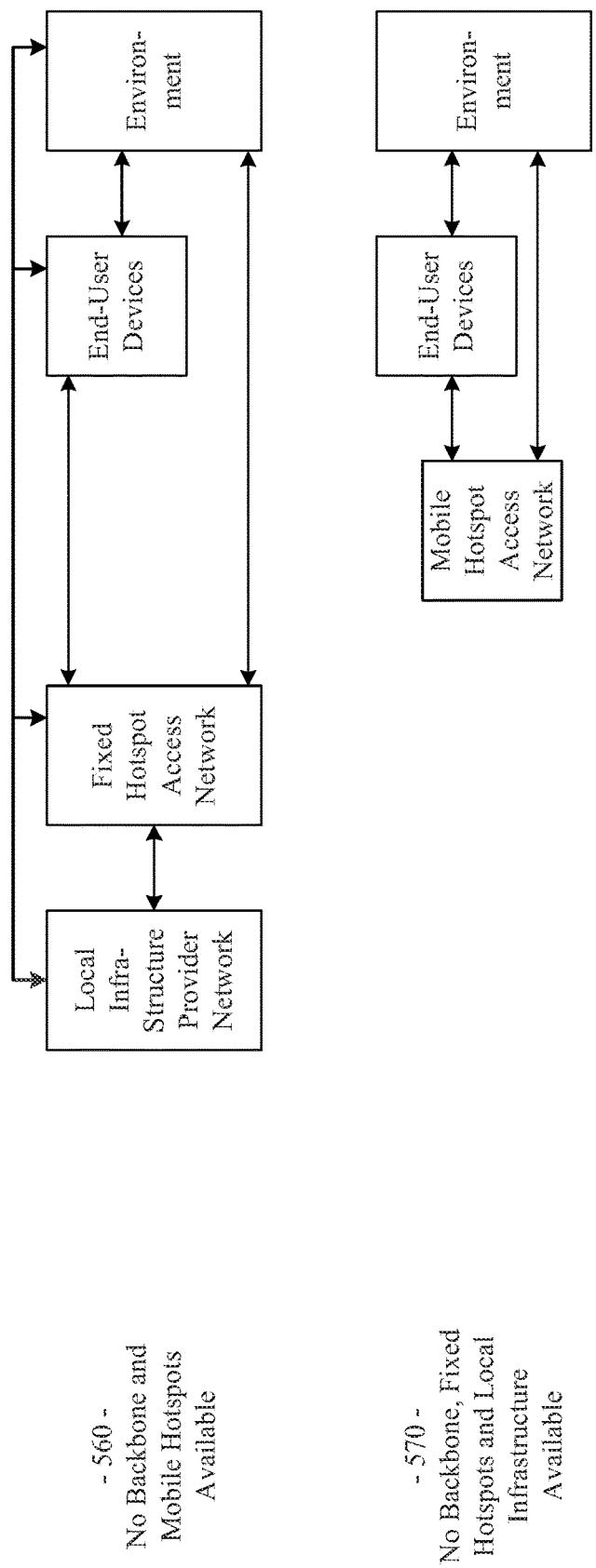

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, 600, 700, 800, 900, and 1000, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of Cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
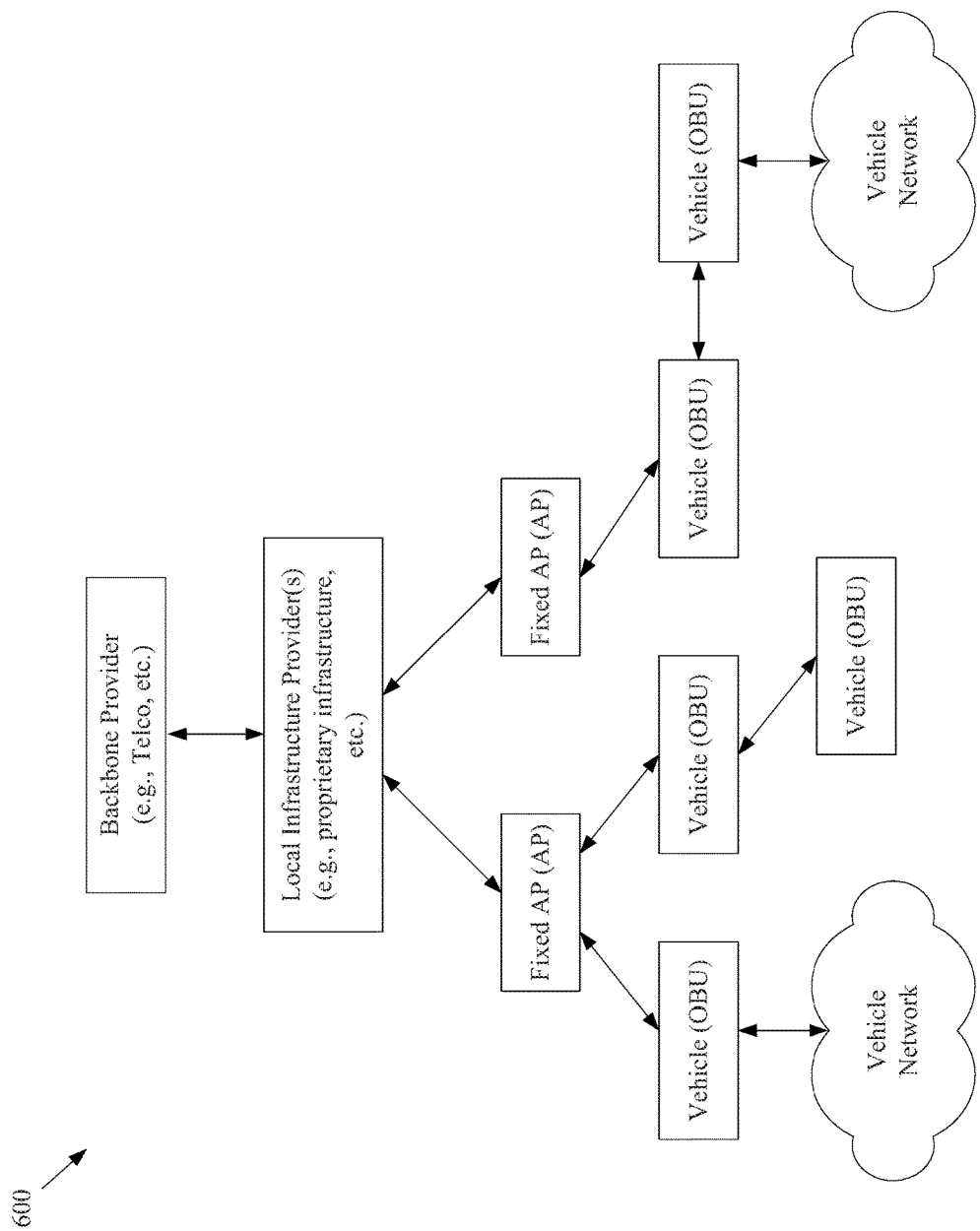
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, 500-570, 700, 800, 900, and 1000, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

As shown in the various example communication networks presented herein, a Mobile AP may establish a communication link with the backbone (or backhaul) network in any of a variety of manners. Various aspects of the present disclosure provide systems and methods for managing the connectivity between various nodes. Most examples herein are presented in the context of managing connectivity between Mobile APs and the backhaul, but the scope of this disclosure is not limited thereto. For example, any or all aspects of the present disclosure may be applied to Fixed APs and/or other communication network nodes.

Various aspects of the present disclosure provide a vehicle network (e.g., a smart city network, a harbor network, a port network, a campus network, etc.) that provides continuous connectivity, for example between an end user (or client) device or sensor and a backhaul (or backbone) network. The topology of a vehicle-based communication network, for example including Mobile APs, may change rapidly, often, and in unexpected manners. Thus, the various connections, for example between a Mobile AP and the backhaul network may need to be updated quickly and often. Additionally, the possibility of misconfiguration, malfunction, malicious attacks, etc. may render various portions of the network unusable, for example causing Mobile or Fixed APs to fail to provide access to the backhaul network (e.g., despite advertising such access). Further, in various use scenarios (e.g., for security reasons, for performance reasons, etc.), some nodes might not be allowed to connect to particular APs and/or might only be allowed to connect to a restricted set of APs. Still further, because Fixed APs might not cover the entire geographical region of operation (e.g., due to cost or installation issues, outages, etc.), alternative connection technologies may be utilized for a node (e.g., fallback connection technologies), for example a connection technology that is widely available within the region. Additionally, various applications (e.g., IP mobility, etc.) may leverage some degree of control over the connection, for example to validate the connection, perform auxiliary tasks when a connection is established, etc. Also, in various operating scenarios (e.g., LoS (Line-of-Sight), NLoS (Non-Line-of-Sight), etc.), for example operation in tunnels, on or under bridges, at crossroads, in container or storage canyons in ports, etc., various communication technologies may have advantages over other communication technologies (e.g., DSRC over Wi-Fi, etc.). Further, certain APs may use dedicated technologies and/or a plurality of technologies that may be flexibly selected and utilized (e.g., IEEE 802.11p, 802.11a/b/g/n, etc.), sometimes even different technologies within a same network.

Figure 7:
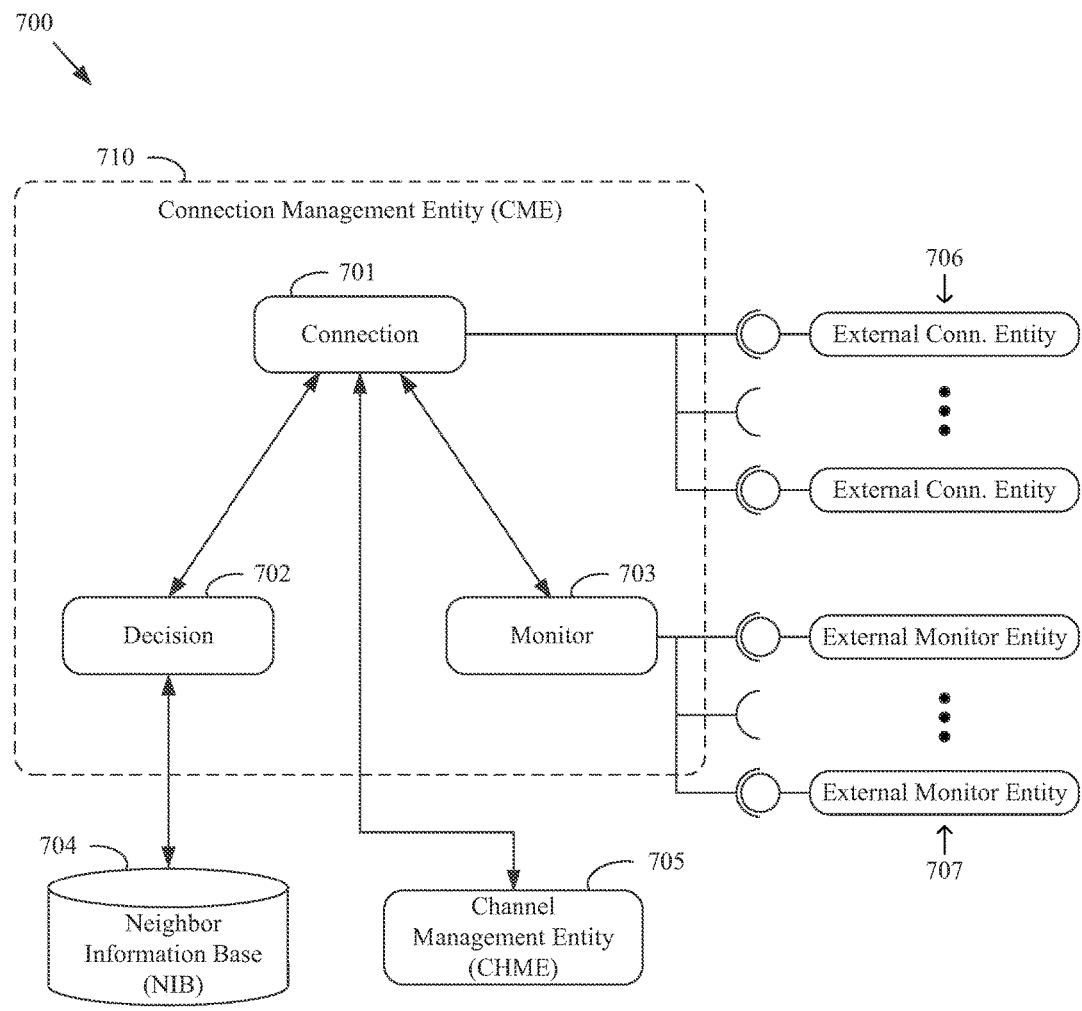
FIG. 7 shows a block diagram of an example communication network, in accordance with various aspects of the present disclosure.

Accordingly, various aspects of the present disclosure provide an entity (e.g., an independent, dedicated entity, etc.) that decides how to connect to the backhaul network, establishes the connection, and monitors an existing connection for failures. The entity may, for example, be referred to herein in a non-limiting manner as a "Connection Management Entity" or CME. An example of the CME 710 is provided in FIG. 7, which shows a block diagram of an example connection management system of a communication network, in accordance with various aspects of the present disclosure. For example and without limitation, any or all of the various components of the example system 700 may be implemented in a Mobile AP. The example system 700 may, for example, share any or all characteristics with the other example networks and/or network components 100, 200, 300, 400, 500-570, 600, 800, 900, and 1000, discussed herein.

The CME 710 (e.g., a module, a process, etc.) may, for example, be implemented in a Mobile AP. The CME 710 or any portion thereof may also, however, be implemented in any of a variety of nodes (e.g., a Fixed AP, etc.) or may be implemented in a distributed manner between various nodes. The CME 710 may, for example, keep track of neighboring nodes available for connection and/or broadcast the current node's own availability. The CME 710 may, for example, support multi-hop connections to other nodes (e.g., a Mobile AP connecting to another Mobile AP, which is in turn connected to a Fixed AP, etc.) and/or serve as a routing (or intermediate) node for neighbors (e.g., simultaneously). The CME 710 may, for example, support multiple connection technologies with variable decision weights and cost functions, handling scenarios with different levels of mobility and density of nodes in an adaptive and configurable fashion. The CME 710 may, for example, utilize a fallback technology, such as a cellular or satellite network, to provide connectivity in areas where there is no Fixed or Mobile AP coverage. Such technology may also be utilized in emergency scenarios (e.g., when a relatively more expensive but relatively more reliable cellular network may be utilized instead of other available networks). The CME 710 may also, for example, provide hooks (or interfaces) for external entities to control certain aspects of the connection, to adapt the cost function or other node decision-making criteria, etc. The CME 710 may also, for example, maintain a blacklist of APs that are not to be utilized (e.g., APs that advertise a backhaul connection but that do not provide it, etc.), and/or maintain a whitelist of APs that may be utilized (e.g., a restricted set of APs that may be connected to).

In accordance with various aspects of this disclosure, a cost function H(*) may be provided, for example to be minimized by the Connection Management Entity (CME) 710 when performing a decision. The cost function may comprise any of a variety of characteristics, non-limiting examples of which are provided herein. For example, the cost function may be based on a single parameter and/or a plurality of parameters (e.g., a weighted function in which various parameters may be weighted differently or equally). An example cost function may, for example, consider any one or more of: a Received Signal Strength Indicator (RSSI) (or negative thereof) of the link to the candidate node; an average of the RSSI (or negative thereof) over the uplink chain of the candidate node; the geographical distance to the candidate node, the velocity of the candidate node (e.g., relative to the CME's node or in absolute terms), whether the candidate node is stopped, relatively slow moving, or relatively fast moving, etc.); the type of the candidate node (e.g., mobile or fixed, etc.); the present load of the candidate node, preferences of users that are connected to the AP (e.g., specifying preferred nodes or nodes types, forbidden nodes or node types, authorized nodes or node types, etc.), etc. A stationary or slow-moving node may, for example, be preferred over fast-moving nodes. A node serving relatively few other nodes may, for example, be preferred over a node serving many other nodes. Location, velocity, and/or trajectory may be utilized to estimate an amount of time for which a node may be in-range, where a node having a velocity indicative of a longer in-range time may be preferred. Also for example, route information for a vehicle may be utilized to identify a node that will be within range for the longest expected time. Further for example, historical data regarding repeating connections may be utilized to tune the selection process. Such historical data may, for example, be retrieved or indexed by geographical location of the node. For example, the cost function may consider any information from the Neighbor Information Base (NIB) discussed herein. The cost function may also be configurable, for example redefined dynamically based on the client requirements, the present needs of a fleet, present operating conditions, present monetary costs, present loads, present emergency or other prioritization conditions, present delay tolerance conditions, etc.

Note that the node selection function may be expanded to include information from other nodes regarding connectivity and/or throughput issues detected in real-time by the other nodes. For example, another node may provide information concerning detected network bottlenecks, cut-offs, security issues, etc. Also note that node priority may be considered in the node selection.

A Neighbor Information Base (NIB) 704 may be provided, which stores information about neighboring nodes (NN) and makes such information available to other entities in the system. The information about each NN may also be referred to herein as its context. The context may comprise, for example for each NN, enough information to connect to it and/or to determine whether to connect to it. The context may, for example and without limitation, comprise:
a. a node identifier (NID);
b. the type of node (e.g., fixed, mobile, etc.);
c. the type of its backhaul connection;
d. the state of its backhaul connection (e.g., one of: NONE, ONGOING, ESTABLISHED, etc.);
e. the number of hops used for the backhaul connection;
f. the NID of the node to which it is connected, if applicable; and
g. the NID of the endpoint of its backhaul connection, if applicable.

The context may also, for example, include all other information, various examples of which are presented herein, that may be utilized to calculate the cost function H(*) and/or to generally select a node with which to connect. Note that the NIB 704 or a portion thereof may be stored and/or maintained locally with the CME 710 (e.g., within a same node), and/or the NIB 704 may be stored and/or maintained remote from the CME 710 (e.g., within a different node, within a Cloud server, etc.).

In accordance with various aspects of this disclosure, a CHannel Management Entity (CHME) 705 is provided, which advertises information about the node to the NNs, for example using any of a variety of technologies (e.g., 802.11p WAVE services, dual Wi-Fi radios with one radio configured as the AP, etc.). The information transmitted by the CHME 705 may, for example, comprise the types of information that are stored in each NIB entry.

The CME 710 may, for example, perform various types of functionality. For example, the CME 710 may perform connection functionality, for example establishing one or more connections to the backhaul network, which is illustrated as the Connection block 701 in FIG. 7; Decision functionality, for example deciding what network(s) the node is to use, which is illustrated as the Decision block 702 in FIG. 7; and Monitoring functionality 703, for example monitoring the existing connection(s) for failures, anomalies, various performance metrics, etc., which is illustrated as the Monitoring block 703 in FIG. 7. The CME 710 (e.g., the operation thereof) may be configured utilizing any of a variety of parameters, non-limiting examples of which are provided herein. Such parameters may, for example, comprise:

| Parameter | Symbol |
|---|---|
| Maximum length of uplink chain | $U_{max}$ |
| Maximum number of retries for each NN | $R_{max}$ |
| Maximum time to keep an NN in the decision blacklist | $T_{bl}$ |
| NN blacklist for decision | $L_b$ |
| NN whitelist for decision | $L_w$ |
| Decision cycle period | $T_d$ |
| Monitor cycle period | $T_m$ |
| Maximum time for disconnection to finish | $T_x$ |
| Maximum time until NN is considered to have disappeared | $T_l$ |
| Minimum time to consider NN viable for decision | $T_{OK}$ |
| Minimum time to change NN decision | $T_{sw}$ |
| Minimum difference in cost function value to switch decision | $\Delta H_{min}$ |

The example Connection block 701 may, for example, receive (or retrieve) information from the Decision block 702 in order to establish a new connection (e.g., a new connection to an AP or fallback network). In one example implementation, the Connection block 701 may:
 1. Notify the Monitor block 703 that a connection will take place.
 2. Request that the CHME 705 advertise the ONGOING connection.
 3. Invoke each External Connection Entity (ECE) 706 in a predefined order. Each ECE 706 may for example perform such tasks as: preemptively testing the new connection (e.g., by attempting to reach the backhaul network or specific hosts, by performing handshakes with control servers, etc.), setting up IP mobility, establishing network routes, etc. Any ECE 706 may for example interrupt the connection process if necessary.
 4. Request that the CHME 705 advertise the ESTABLISHED connection.
 5. Notify the Decision block 702 and the Monitor block 703 of the new connection.

In an example scenario in which there is a failure in any of the above steps or an interruption by an ECE 706, the Decision block 702 and the Monitor block 703 are notified of the failure and the CME 710 requests that the CHME 705 advertise the NONE connection state. Apart from establishing connections, the Connection block 701 may also be responsible for disconnecting from the backhaul whenever the Decision block 702 so decides.

The example Decision block 702 may, for example, make decisions about the preferred backhaul connection(s) and communicate them to the Connection block 701. The Decision block 702 may, for example, maintain a list of NNs, for example a Candidate Neighbor List (CNL). Each entry in the CNL may, for example, comprise any of a variety of different types of information, non-limiting examples of which are provided herein. For example, where each node entry in the CNL may comprise:

| Field | Symbol |
|---|---|
| Flag indicating whether it is valid to connect to this node | $CN_{OK}$ |
| Number of times a connection to this node was attempted | $CN_{att}$ |
| Time elapsed since node was first added to the CNL | $CN_0$ |
| Time elapsed since node was last obtained from the NIB | $CN_l$ |
| Time elapsed since node minimized cost function | $CN_{opt}$ |
| Time elapsed since node was temporarily blacklisted | $CN_{bl}$ |
| Context of node obtained from NIB | — |

In order to maintain the CNL (or information thereof), the Decision block 702 may, for example, perform the following procedure either periodically (e.g., with period $T_d$), whenever the NIB 704 alerts the Decision block 702 of changes to the NID table, whenever the NIB 704 advertises the NID table or portions thereof (e.g., periodically whether or not the NID table has been changed, etc.), etc.:
 1. Obtain the information for all of the NNs from the NIB 704, ignoring: unconnected nodes; nodes with long uplink chains ($\geq U_{max}$); nodes $\in L_b$, if the list exists; and nodes $\notin L_w$, if the list exists. All NNs which are not ignored are termed Candidate Nodes (CN).
 2. For all CNs already in the CNL:
    a. If the number of hops used for the backhaul connection, the next hop in the uplink chain, or the connection endpoint change, reset the retry counter ($CN_{att} \leftarrow 0$).
    b. If the $CN_{att} \geq R_{max}$:
       i. If $CN_{OK}$ is set, unset it and set $CN_{bl}$ to the current time.
       ii. Else, if $CN_{bl} \geq T_{bl}$, $CN_{att} \leftarrow 0$ and $CN_{OK}$ is set.
    c. Else, if $CN_{OK}$ is not set and $CN_0 \geq T_{OK}$, set $CN_{OK}$.
 3. For all CNs not yet in the CNL, add the CN to the CNL.

The CNL may, for example, then be pruned (or filtered) by removing all CNs where $CN_l \geq T_l$. For all CNs in the CNL with $CN_{OK}$ set, the one which minimizes H(*) may be picked as the Optimal Node (ON). If no valid CN is available but a fallback network exists and may be used, such fallback network is picked as the preferred connection method. If no fallback network exists, then the Decision block 702 informs the Connection block 701 that no connection is currently possible.

If a fallback network is currently in use, the ON is immediately picked as the node to use for the backhaul connection; otherwise, if there is a current connection through an Established Node (EN), the ON is only picked if $H(EN)-H(ON) \geq \Delta H_{min}$ and $ON_{opt} \geq T_{sw}$, in which case it becomes the EN. Once a new decision is made, the Decision block 702 informs the Connection block 701, and the Decision block 702 expects a response indicating the success or failure of the connection. If an EN exists and the connection fails, $EN_{att}$ is incremented.

The Monitor block 703 may, for example, verify the connection state. For example, the Monitor block 703 may periodically (e.g., with period $T_m$) or continually verify the connection state so long as there is an active connection, as informed by the Connection block 701. To do so, the Monitor block 703 may, for example, invoke one or more External Monitor Entities (EME) 707, which check for failures or relevant changes in any of the components managed by the ECEs 706 (e.g., network routes, network interface addresses, etc.) and report them to Monitor block 703, which in turn informs the Connection block 701 (e.g., for connection repair). Additionally, the Monitor block 703 may also keep track of the context of the next hop node, if applicable, and inform the Connection block 701 any time its connection status changes (e.g., the length of its uplink chain, its own next hop, the connection endpoint, etc.). Additionally for example, once the Monitor block 703 is informed that the connection will be undone (or broken down), it may wait (e.g., up to $T_x$) for the EMEs 707 to report that the disconnection was properly performed and for the CHME 705 to advertise the NONE connection state.

As shown here, the CME 710 (and/or related modules) provides a general mechanism to manage connections (e.g., backhaul connections, etc.) in very dynamic, fast-changing, heterogeneous networks. The connection management system and/or method provided herein also supports arbitrary external entities to control various aspects of the connection, supplying a high-performance and integrated replacement for ad-hoc solutions, which simplifies the implementation of solutions like IP mobility. The dynamic topology of vehicular networks no longer causes (or causes fewer) connectivity issues, for example due to the responsive architecture of the CME 710 and the use of a Monitor block 703. Also, the use of a generic CHME 705 and cost function allows the adaptation of the decision to multiple technologies, supporting heterogeneous networks with fallback. Further, multihop connections are entirely supported. In addition, various security concerns are addressed by supporting (possibly dynamic) AP whitelists and blacklists, which may be used not only for testing purposes but also to partition the network (e.g., from a central management entity).

A communication network (or components thereof) implemented in accordance with various aspects of this disclosure facilitates use cases with Wi-Fi-on-the-move and ground team management, for example by implementing always-on backhaul connection, including to the Internet and/or private networks, in cities and difficult spaces with radio obstructions or low AP density, for example through the use of multi-hop connectivity. Such a network (or components thereof) also simplifies the implementation of added-value services (e.g., including dynamic network reconfiguration, software updates, etc.), including third-party, by allowing the use of a normal IP-based protocol stack and remote servers in public or private clouds. The use of a variable (or adaptable) cost function allows clients and operators to determine cost/performance trade-offs, for example minimizing traffic usage costs by avoiding fallback networks which are typically more expensive.

As discussed herein, any of a variety of technologies may be utilized to establish a communication link between a Mobile AP and the backhaul (or backbone) network, the cloud, etc. In an example implementation, one of the selectable links (or link technologies) may comprise Wi-Fi. For example, in various networking environments, for example urban environments, Wi-Fi hotspots are widely deployed in public locations (e.g., parks, coffee shops, restaurants, bars, stores, malls, public service, transportation hubs, etc.). Moreover, many of such hotspots (or portions thereof) do not require authentication. Additionally, telco operators are deploying their own networks of Wi-Fi hotspots, for example to provide more and better connectivity to their customers, and to also facilitate offloading traffic from their cellular networks. Additionally, residential gateways may also be equipped with both private and public Wi-Fi networks, which for example allow customers of a telco operator to use the public Wi-Fi network provided by the gateways of other customers.

The proliferation of Wi-Fi hotspots offers a cost-effective opportunity for both mobile and Fixed APs to connect to the Internet as a backhaul of the network of moving things. For example, reliable Wi-Fi hotspots with a good signal quality can be identified in order to provide the infrastructure backbone to Fixed APs, avoiding the necessity of deploying the expensive cable connectivity (e.g., fiber, etc.). Such Wi-Fi hotspots can also be used to perform bidirectional content offload (e.g., to and from the Mobile APs), which, depending on their density, reduces the costs of deploying a network of moving things infrastructure.

Various aspects of the present invention thus provide for Wi-Fi connectivity to the Internet, for both Fixed APs and Mobile APs. A connection manager (e.g., a CME) may, for example, look for Wi-Fi connectivity opportunities in addition to connectivity opportunities between Mobile APs and Fixed APs (or, for example, cellular connectivity opportunities). A Wi-Fi connectivity survey mechanism may, for example, maintain a database of preferred and/or useful Wi-Fi hotspots (e.g., containing location information, identification information, access information if needed, etc.).

Figure 8:
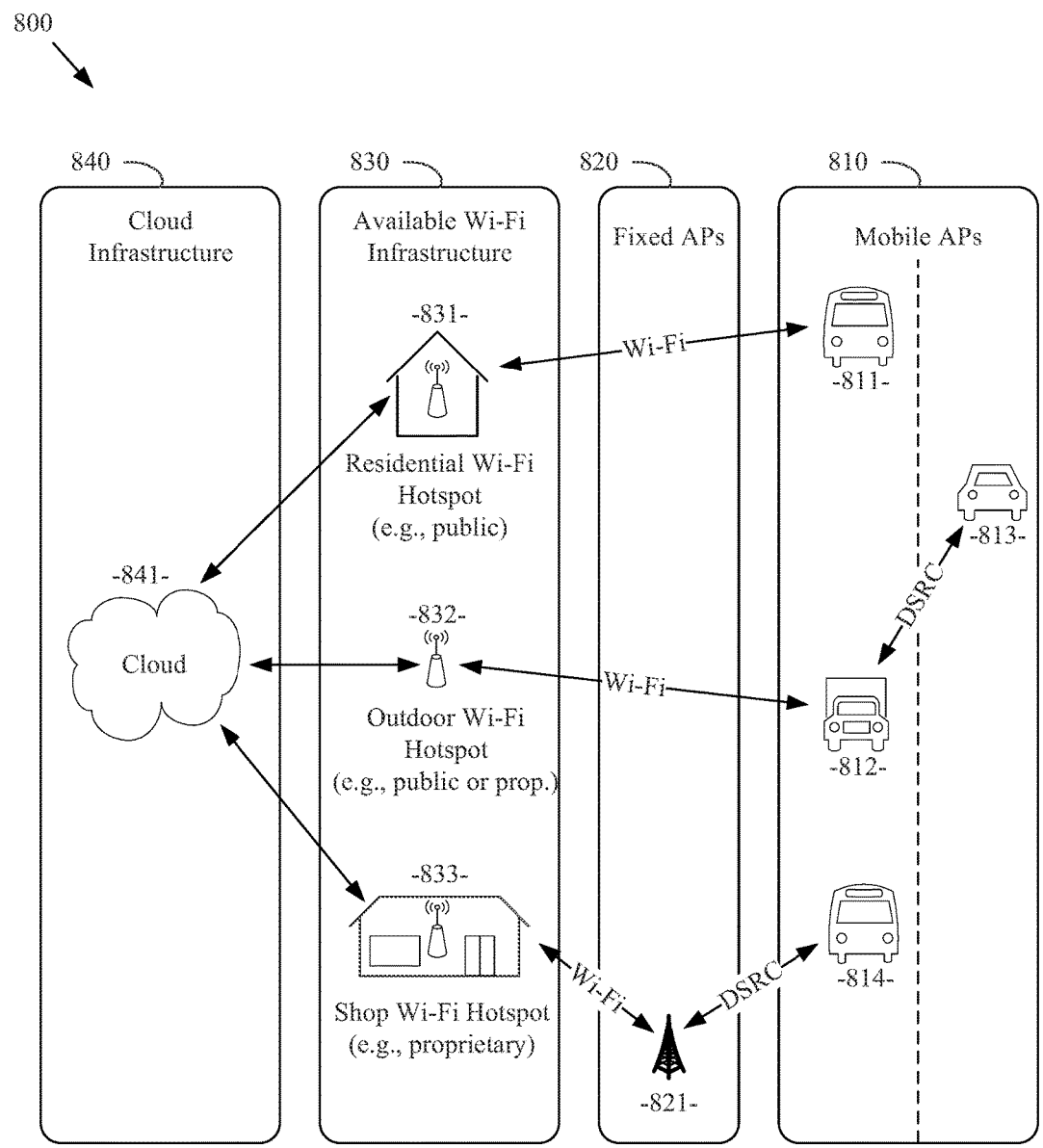
FIG. 8 shows a block diagram of an example communication network, in accordance with various aspects of the present disclosure.

FIG. 8 shows a block diagram of an example communication network, in accordance with various aspects of the present disclosure. The example network 800 may, for example, share any or all characteristics with the other example networks and/or network components 100, 200, 300, 400, 500-570, 600, 700, 900, and 1000 discussed herein.

The example network 800 illustrates various example scenarios utilizing Wi-Fi for backhaul functionality or connectivity. In a first example scenario, a first Mobile AP 811 may connect to the public Wi-Fi network provided by a residential gateway 831. For example, a residence may comprise a Wi-Fi hotspot partitioned for private access (e.g., for the inhabitants of the residence) and for public access. Such partitioning may, for example, be implemented with different respective Wi-Fi transceivers operating in different bands or on different channels. In another example scenario, a second Mobile AP 812 may connect directly to a second public (or proprietary with permission) outdoor Wi-Fi hotspot 832. In turn, a third Mobile AP 813 connects via DSRC to the second Mobile AP 812 to reach the Internet (or Cloud). The third Wi-Fi hotspot 833 (e.g., at a shop, restaurant, store, pub, etc.) can also be used as backhaul for a Fixed AP 821, which in turn provides connectivity to a fourth Mobile AP 814 via DSRC. Such a configuration may, for example, facilitate relatively easy installment of Fixed AP service, for example permanently or temporarily (e.g., until wired connections are established to the Fixed AP.

As shown in FIG. 8 and as discussed herein, both Mobile and Fixed APs may be equipped with a Wi-Fi network interface dedicated to searching for Wi-Fi connection opportunities and/or maintaining Wi-Fi links (e.g., infrastructure links). This may, for example, be implemented utilizing multi-radio Wi-Fi technology in which a first Wi-Fi transceiver (e.g., of a Mobile AP) is utilized to provide connectivity to end user clients, sensors, etc., and a second Wi-Fi transceiver is utilized to search for and/or provide backbone connectivity with a Wi-Fi hotspot when available. For example, the first Wi-Fi transceiver may operate in different frequency bands (e.g., 2.4 GHz and 5 GHz) and/or different channels within the same band.

When moving, the Mobile AP may be able to associate with different Wi-Fi hotspots as the Mobile AP moves in-range and out-of-range of such hotspots. For a Fixed AP, the AP may typically be associated to one reliable Wi-Fi network or hotspot (and for example a second Wi-Fi network or hotspot as a fail-over network).

The Mobile AP may, for example, execute an algorithm that controls which Wi-Fi hotspots it should associate with and, if it is successful, verifies if it has Internet connectivity using that hotspot. Such functionality may, for example, be implemented in an independent process and/or may be implemented as part of any of the other processes discussed herein (e.g., with regard to the Connection Management Entity discussion). In an example scenario, only after the guarantee of Internet connectivity through the Wi-Fi hotspot is the Wi-Fi hotspot information updated to show that the connection is available.

Depending on commercial agreements, if relied upon, performing an authentication procedure may be required before association with the Wi-Fi network is allowed. For example, in an example scenario in which the Wi-Fi hotspot is a private hotspot, a commercial agreement may be established between the operator of the vehicle network and the operator of the Wi-Fi hotspot by which various nodes of the vehicle network (e.g., Fixed APs, Mobile APs, etc.) may access the Internet via the Wi-Fi hotspot.

Depending on the type of service being provided, the new Wi-Fi connection can be used to offload any of a variety of different types of traffic. For example, the new Wi-Fi connection may be utilized to offload delay-tolerant information, downloading content from the cloud infrastructure, software updates, etc.

While a connection is being utilized, the connection manager (e.g., the CME 710 or other entity) may continually analyze the quality of the connection (e.g., utilizing a Monitor block 703) and determine when to stop utilizing the connection and/or switch to another Wi-Fi hotspot if available and/or another technology. For example, when it is determined that the Wi-Fi connection quality is below a threshold level, the connection manager may identify and establish the next connection. In an example scenario in which the search for other network connections is continual (or, for example, periodic with a search period), the connection manager may have already identified the next connection by the time it is determined that the current connection should be replaced.

Figure 9:
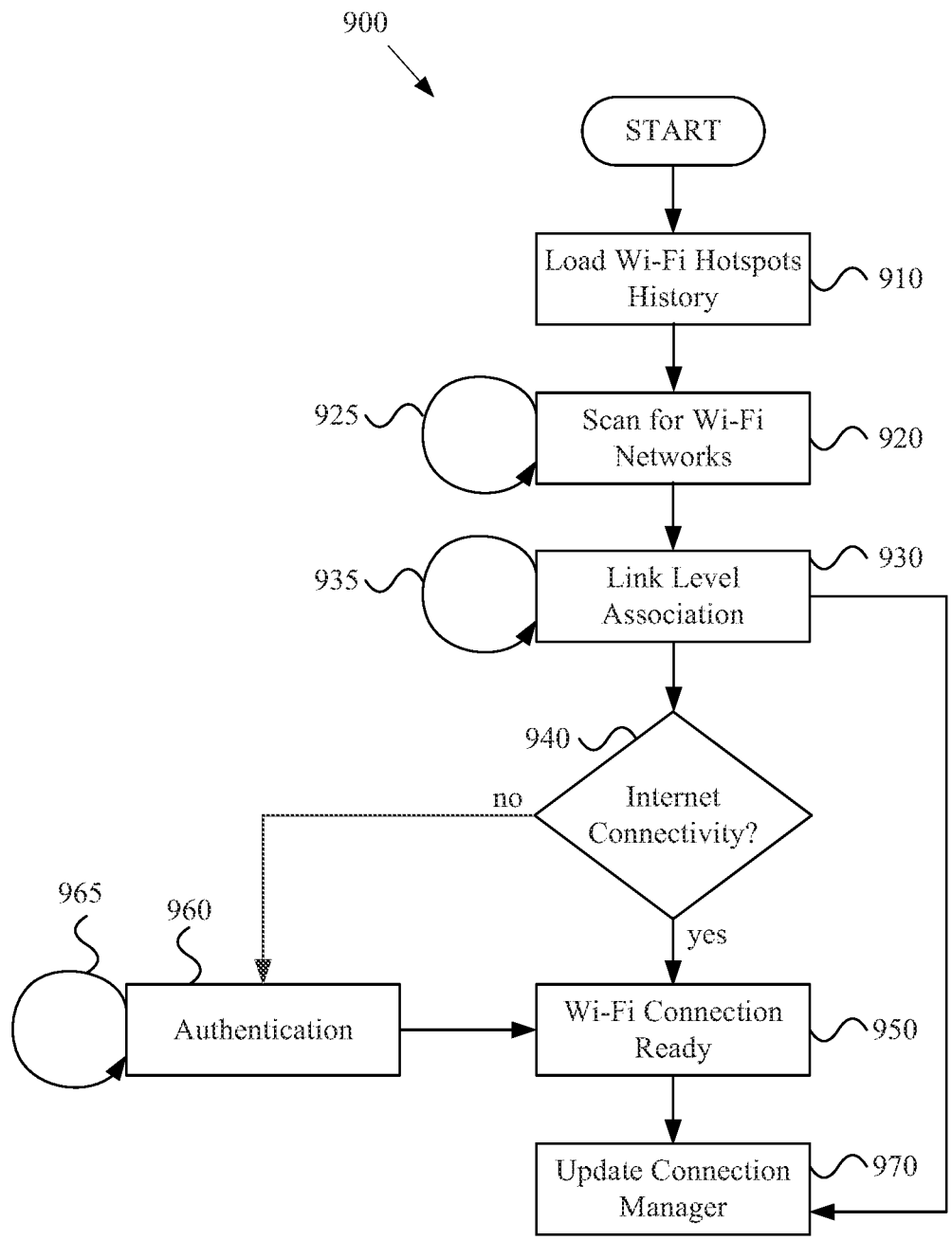
FIG. 9 shows a flow diagram of an example method for managing connectivity, in accordance with various aspects of the present disclosure.

As discussed herein, a process of the AP node (e.g., a CME process or other process) may continually (or periodically) run, searching for and/or utilizing a best Wi-Fi hotspot connection. FIG. 9 shows a block diagram of an example control method, in accordance with various aspects of the present disclosure. The example method 900 (or a network or one or more network components operating in accordance with such method 900) may, for example, share any or all characteristics with the other example networks and/or network components 100, 200, 300, 400, 500-570, 600, 700, 800, and 1000 discussed herein.

In an example implementation, the Wi-Fi networks to search for can be selected based on commercial agreements between the company operating the APs and the company operating the Wi-Fi hotspots. Moreover, a performance history of the Wi-Fi hotspots in a given location can also be kept and updated (e.g., locally, in cloud services, etc.) so that the APs may connect to the best hotspots. For the given location, the AP may for example consult a database which returns a ranked list of the best Wi-Fi hotspots to which the AP may connect at that location or area. The example method 900 may, at block 910, comprise receiving (or loading or storing) a list of hotspots historically utilized and/or authorized to be utilized at or near a particular area. Note that the list may comprise public hotspots, private hotspots (e.g., of cooperating business or individuals, etc.), Mobile and/or Fixed APs, any combination thereof, etc.

At block 920, the AP may then traverse the list of hotspots, for example traversing a ranked list until a Wi-Fi connection with the highest ranked hotspot is found, traversing the entire list of hotspots and identifying a best hotspot, etc. The AP may, for example, search for and analyze a respective Wi-Fi connection for any or all entries of the list. The AP may also, for example, search for and analyze Wi-Fi connections for hotspots that are not on the list. The AP may identify a best or favorite hotspot in any of a variety of manners and/or in accordance with any of a variety of metrics, many examples of which are provided herein (e.g., signal strength, load, location, Mobile AP velocity, error rate, number of other nodes connected, historical experience with the hotspot, cost of utilizing the hotspot, estimated time to be within range of the hotspot, etc.). As indicated by flow line 925, the AP may continue scanning until a hotspot determination is made.

After detecting (or determining) the most suitable Wi-Fi hotspot, the AP may, for example at block 930, comprise performing link level (or layer) association. A continuous evaluation of the link-level association may then be performed, for example as indicated by flow line 935, in order to notify the connection manager as soon as possible whenever the Wi-Fi hotspot signal has been lost or has become too weak or otherwise inadequate. If the connection is lost while performing the link level (or layer) association, then flow of the example method 900 proceeds to block 970, at which the Connection Manager is updated with the current connection status.

Note that although various examples presented herein discuss using Wi-Fi hotspots run by others, the operator of the network of moving things (e.g., a vehicle network, etc.) may also install Wi-Fi hotspots at particular advantageous locations and strategically utilize such Wi-Fi hotspots. For example, bus stops, fuel depots, dumping stations, maintenance locations, high-traffic areas, notoriously busy intersections, etc., may be equipped with Wi-Fi hotspots.

After the association phase, the example method 900, for example at block 940, comprise checking for Internet connectivity, which among other things, allows the AP to determine whether the Wi-Fi interface of the AP has a valid network configuration. If so, then flow of the example method 900 proceeds to block 950, concluding that the Wi-Fi connection is ready, and to block 960, updating the Connection Manager about the new state of the Wi-Fi connection.

In an example scenario in which the AP is correctly associated with a Wi-Fi hotspot but not capable of connecting to the Internet, flow of the example method 900 proceeds to block 960, at which the AP performs authentication. The initial list of Wi-Fi hotspots that the AP retrieves from the cloud (and/or from a locally maintained list) may for example have the login information for the hotspots that may require authentication. Since the authentication process may, for example, add an extra delay and requires a good connection to be successful, the example method 900 allows the authentication process to be repeated (e.g., until a certain number of failed attempts) provided that the AP keeps connected to the same hotspot. Such repetition is shown graphically in FIG. 9 at flow line 965.

At block 970, the Connection Manager is notified about the availability of the Wi-Fi connection and, depending on the service constraints, may then select the Wi-Fi interface as the default communication interface, for example until the connection is lost (or degraded to a particular level) or a better connection appears.

In accordance with various aspects of the present disclosure, a communication network of moving things may, for example, leverage the capabilities of a wide-ranging and often under-exploited wireless infrastructure as a backhaul. Various aspects of the disclosure provide a system and method that opportunistically utilizes Wi-Fi resources (e.g., of public networks, of the private networks of others, and even of the network operator). The various aspects provide for cost-effective AP deployment, low-cost information off-load (e.g., from the Mobile APs to the cloud), low-cost information dissemination (e.g., from the cloud to the Mobile APs), and decreases the average overall time for transporting information to the cloud. Additionally, connectivity range for the moving network is improved without having to deploy additional fixed infrastructure.

Note that the Wi-Fi connectivity may be incorporated into mobility and/or hand-off algorithms. For example, an on-going connection for a Mobile AP may be passed from a first Wi-Fi hotspot to a fixed 802.11p AP, to a Mobile AP, to a second Wi-Fi hotspot, to a cellular link, etc. Also for example, an on-going connection may be handed off from a first Wi-Fi hotspot operated by a first operator to a second Wi-Fi hotspot operated by a second operator (e.g., utilizing various technologies, for example, Wi-Fi Passpoint, 802.11u, etc.).

Figure 10:
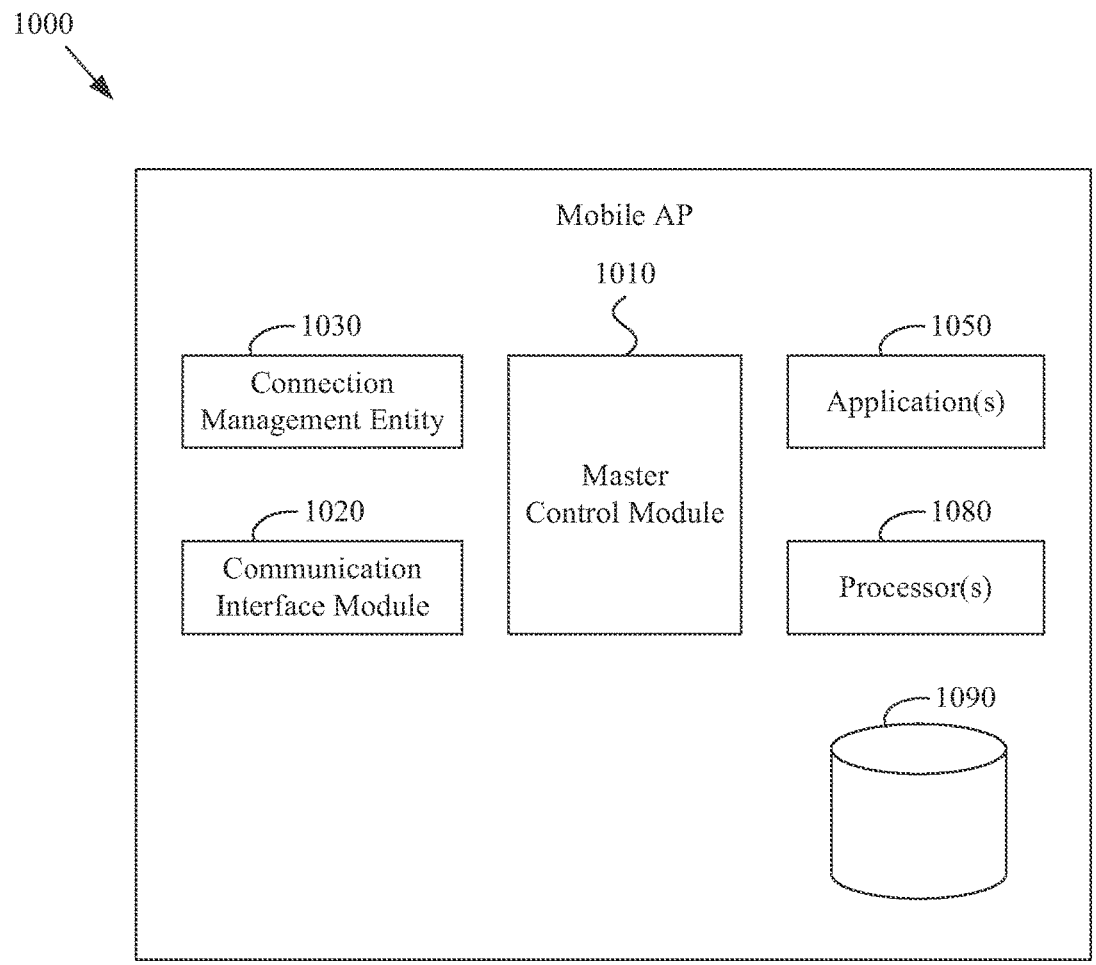
FIG. 10 shows a block diagram of an example network node, in accordance with various aspects of the present disclosure.

FIG. 10 shows a block diagram of various components of an example network node, in accordance with various aspects of the present disclosure. The example node 1000 may, for example, share any or all characteristics with the other example methods, networks, and/or network components 100, 200, 300, 400, 500-570, 600, 700, 800, and 900, discussed herein. For example, any or all of the components of the example node 1000 may perform any or all of the method steps presented herein.

Though labeled "Mobile AP," the network node 1000 may, for example, comprise an access point (AP) node (e.g., a Mobile AP, a Fixed AP, etc.), any node presented herein, etc. The example node 1000 may comprise a variety of components (or modules), non-limiting examples of which are provided herein.

The example node 1000 may, for example, comprise a communication interface (I/F) module 1020 (e.g., including a cellular communication interface module, mobile network communication interface module, Wi-Fi communication interface module, user/client communication interface module, etc.) that operates to perform any or all of the wireless and/or wired communication functionality for the node 1000, many examples of which are provided herein (e.g., communication with sensors external to the node 1000, communication with the onboard diagnostic (OBD) system of a vehicle in which the node 1000 is installed, communication with peer APs, communication between Mobile APs and Fixed APs, communication with Network Controllers, communication with client devices, backhaul communication, Cloud server communication, etc.). The communication interface (I/F) module 1020 may, for example, operate in accordance with any of a variety of cellular communication protocols, 3G, 4G, LTE, wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), TCP/IP, etc.

The example node 1000 may, for example, comprise a Connection Management Entity (CME) 1030 that operates to perform any or all of the connection management functionality discussed herein. The example CME 1030 may, for example, comprise hardware and/or software that operate to implement any or all of the node's connection management functionality discussed herein. For example, the CME 1030 may share any or all characteristics with the CME 710 and/or system 700 of FIG. 7, discussed herein. Also for example, the CME 1030 may operate to perform any or all blocks of the example method 900 of FIG. 9, discussed herein.

The example node 1000 may, for example, comprise a Master Control Module 1010 that generally manages operation of the node 1000 at a high level. Such Master Control Module 1010 may, for example, comprise various aspects of an operating system for the node 1000.

The example node 1000 may further, for example, comprise one or more applications 1050 executing on the node 1000 (e.g., client management applications, security applications, power management applications, vehicle monitoring applications, location services applications, sensor interface applications, etc.).

The example node 1000 may also comprise one or more processors 1080 and memory devices 1090. The processor(s) 1080 may, for example, comprise any of a variety of processor characteristics. For example, the processor(s) 1080 may comprise one or more of a general purpose processor, RIS processor, microcontroller, ASIC, DSP, video processor, etc.). The memory device(s) 1090 may, for example comprise any of a variety of memory characteristics. For example, the memory device(s) 1090 may comprise a volatile memory, non-volatile memory, etc. The memory device(s) 1090 may, for example, comprise a non-transitory computer-readable medium that comprises software instructions that when executed by the processor(s) 1080, cause the node 1000 (or modules or entities thereof) to perform any or all of the functionality discussed herein (e.g., with regard to the example methods discussed herein, etc.). The memory device(s) 1090 may, for example, store node information (e.g., CNL information, Wi-Fi hotspot list information, NIB information, configurable cost function information, etc.).

In accordance with various aspects of this disclosure, examples of the networks and/or components thereof presented herein are provided in U.S. Provisional Application Ser. No. 62/222,192, titled "Communication Network of Moving Things," filed on Sep. 22, 2015.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing network (or mobility) controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide systems and methods for managing connectivity in a network of moving things. As non-limiting examples, various aspects of this disclosure provide systems and methods for managing connectivity in a network in which at least a portion of the network access points are moving. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A mobile communication network access point comprising:
   at least one wireless transceiver; and
   at least one module comprising a processor and memory, and being operable to, at least:
   utilize the at least one wireless transceiver to provide wireless local area network (WLAN) connectivity to client devices of the access point;
   identify a location of the access point;
   identify a hotspot based, at least in part, on the identified location of the access point; and
   utilize the at least one wireless transceiver to:
      attempt to establish a communication link with the identified hotspot; and
      if said attempt is successful, then communicate data with another network node via the identified hotspot,
   wherein the at least one module is operable to identify the hotspot by, at least in part, consulting a database based on the identified location; and
   wherein the at least one module is operable to consult the database by, at least in part, consulting the database for one or more hotspots historically utilized by the access point at the identified location.

2. The mobile communication network access point of claim 1, wherein the mobile communication network access point is configured to be coupled to a vehicle.

3. The mobile communication network access point of claim 1, wherein the database is stored in the memory of the access point.

4. The mobile communication network access point of claim 1, wherein:
   the database is remote from the access point; and
   the at least one module is operable to consult the database through the mobile communication network.

5. The mobile communication network access point of claim 1, wherein the at least one module is operable to consult the database by, at least in part, consulting the database for a ranked list of hotspots historically utilized by the access point at the identified location.

6. The mobile communication network access point of claim 5, wherein the identified hotspot is a highest ranked hotspot of the ranked list of hotspots.

7. The mobile communication network access point of claim 1, wherein the identified hotspot comprises a WLAN hotspot.

8. The mobile communication network access point of claim 1, wherein:
   the at least one wireless transceiver comprises a first wireless transceiver and a second wireless transceiver; and
   the at least one module is operable to utilize the first wireless transceiver to communicate with the identified hotspot, while simultaneously utilizing the second wireless transceiver to provide the WLAN connectivity to the client devices of the access point.

9. The mobile communication network access point of claim 1, wherein the at least one module is operable to offload traffic communicated with the mobile communication network to the identified hotspot.

10. The mobile communication network access point of claim 1, wherein the access point is mobile.

11. The mobile communication network access point of claim 1, wherein the at least one module is operable to:
   monitor performance of the identified hotspot at the identified location; and
   store information describing the monitored performance of the identified hotspot in the memory.

12. A mobile communication network access point comprising:

at least one wireless transceiver; and
at least one module comprising a processor and memory, and being operable to, at least:
utilize the at least one wireless transceiver to provide wireless local area network (WLAN) connectivity to client devices of the access point;
identify a location of the access point;
identify a hotspot based, at least in part, on the identified location of the access point; and
utilize the at least one wireless transceiver to:
attempt to establish a communication link with the identified hotspot; and
if said attempt is successful, then communicate data with another network node via the identified hotspot,
wherein the at least one module is operable to:
if the identified hotspot is a public hotspot, then establish the communication link with the identified hotspot according to a first protocol for establishing a communication link; and
if the identified hotspot is a private hotspot, then establish the communication link with the identified hotspot using a second protocol, different from the first protocol, for establishing a communication link.

13. A mobile communication network access point comprising:
at least one wireless transceiver; and
at least one module comprising a processor and memory, and being operable to, at least:
utilize the at least one wireless transceiver to provide wireless local area network (WLAN) connectivity to client devices of the access point;
identify a location of the access point, wherein the access point is mobile;
identify a hotspot based, at least in part, on the identified location of the access point; and
utilize the at least one wireless transceiver to:
attempt to establish a communication link with the identified hotspot; and
if said attempt is successful, then communicate data with another network node via the identified hotspot,
wherein the at least one module is operable to identify the hotspot based, at least in part, on velocity of the access point.

14. The mobile communication network access point of claim 13, wherein the mobile communication network access point is configured to be coupled to a vehicle.

15. The mobile communication network access point of claim 13, wherein the at least one module is operable to identify the hotspot by, at least in part, consulting a remote database via the mobile communication network, and wherein said consulting the remote database comprises consulting the remote database based on the identified location.

16. A mobile communication network access point comprising:
at least one wireless transceiver; and
at least one module comprising a processor and memory, and being operable to, at least:
utilize the at least one wireless transceiver to provide wireless local area network (WLAN) connectivity to client devices of the access point;
identify a location of the access point, wherein the access point is mobile;
identify a hotspot based, at least in part, on the identified location of the access point; and
utilize the at least one wireless transceiver to:
attempt to establish a communication link with the identified hotspot; and
if said attempt is successful, then communicate data with another network node via the identified hotspot,
wherein the at least one module is operable to identify the hotspot based, at least in part, on vehicle route information for a vehicle carrying the access point.

17. A mobile communication network access point comprising:
at least one wireless transceiver; and
at least one module comprising a processor and memory, and being operable to, at least:
utilize the at least one wireless transceiver to provide wireless local area network (WLAN) connectivity to client devices of the access point;
identify a location of the access point, wherein the access point is mobile;
identify a hotspot based, at least in part, on the identified location of the access point; and
utilize the at least one wireless transceiver to:
attempt to establish a communication link with the identified hotspot; and
if said attempt is successful, then communicate data with another network node via the identified hotspot,
wherein the at least one module is operable to identify the hotspot based, at least in part, on an estimated time for the access point to be within communication range of the identified hotspot.

18. A mobile communication network access point comprising:
at least one wireless transceiver; and
at least one module comprising a processor and memory, and being operable to, at least:
utilize the at least one wireless transceiver to provide wireless local area network (WLAN) connectivity to client devices of the access point;
identify a location of the access point, wherein the access point is mobile;
identify a hotspot based, at least in part, on the identified location of the access point; and
utilize the at least one wireless transceiver to:
attempt to establish a communication link with the identified hotspot; and
if said attempt is successful, then communicate data with another network node via the identified hotspot,
wherein:
the at least one wireless transceiver comprises a first wireless transceiver, a second wireless transceiver, and a third wireless transceiver;
the at least one module is operable to utilize the first wireless transceiver to communicate with another access point of the mobile communication network, while utilizing the second wireless transceiver to provide the WLAN connectivity to the client devices, and while utilizing the third wireless transceiver to communicate with the identified hotspot.

19. A mobile communication network access point comprising:
at least one wireless transceiver; and
at least one module comprising a processor and memory, and being operable to, at least:

utilize the at least one wireless transceiver to provide wireless local area network (WLAN) connectivity to client devices of the access point;
receive a list of hotspots;
identify a location of the access point;
identify a hotspot based, at least in part, on the identified location of the access point; and
utilize the at least one wireless transceiver to:
attempt to establish a communication link with the identified hotspot; and
if said attempt is successful, then communicate data with another network node via the identified hotspot,
wherein the identified hotspot is not on the list of hotspots.

20. The mobile communication network access point of claim 19, wherein the list of hotspots is ranked for the identified location.

21. The mobile communication network of claim 19, wherein the at least one module is operable to identify the hotspot by, at least in part, traversing the list of hotspots.

22. The mobile communication network of claim 19, wherein the mobile communication network access point is configured to be coupled to a vehicle.

23. The mobile communication network of claim 19, wherein the at least one module is operable to:
monitor performance of the identified hotspot at the identified location; and
modify the received list of hotspots based, at least in part, on the monitored performance of the identified hotspot.

* * * * *